(12) United States Patent
Muramatsu et al.

(10) Patent No.: US 10,713,749 B2
(45) Date of Patent: Jul. 14, 2020

(54) IMAGE SENSOR AND DRIVING METHOD, AND ELECTRONIC APPARATUS

(71) Applicants: SONY CORPORATION, Tokyo (JP); THE UNIVERSITY OF TOKYO, Tokyo (JP)

(72) Inventors: Yoshinori Muramatsu, Kanagawa (JP); Shuji Uehara, Kanagawa (JP); Hironobu Katayama, Kanagawa (JP); Tomohiro Yamazaki, Kanagawa (JP); Masatoshi Ishikawa, Tokyo (JP); Yoshihiro Watanabe, Tokyo (JP)

(73) Assignees: Sony Corporation, Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 16/327,958

(22) PCT Filed: Aug. 23, 2017

(86) PCT No.: PCT/JP2017/030014
§ 371 (c)(1),
(2) Date: Feb. 25, 2019

(87) PCT Pub. No.: WO2018/047618
PCT Pub. Date: Mar. 15, 2018

(65) Prior Publication Data
US 2019/0228497 A1 Jul. 25, 2019

(30) Foreign Application Priority Data
Sep. 8, 2016 (JP) .................. 2016-175826

(51) Int. Cl.
*G06F 13/00* (2006.01)
*G06T 1/20* (2006.01)
(Continued)

(52) U.S. Cl.
CPC .................. *G06T 1/20* (2013.01); *G06T 1/60* (2013.01); *H04N 5/374* (2013.01); *H04N 5/378* (2013.01)

(58) Field of Classification Search
CPC ......... H03M 1/66; H04N 5/378; H04N 5/232; H04N 5/23212; H04N 5/3535; H04N 5/374; G06F 13/4009; G06T 1/20; G06T 1/60
See application file for complete search history.

(56) References Cited

U.S. PATENT DOCUMENTS

2011/0205097 A1* 8/2011 Asayama ............ H03M 1/0863
341/145
2013/0070139 A1 3/2013 Kirsch
(Continued)

FOREIGN PATENT DOCUMENTS

EP 1223549 7/2002
JP H07-062866 3/1995
(Continued)

OTHER PUBLICATIONS

International Search Report prepared by the Japan Patent Office dated Nov. 6, 2017, for International Application No. PCT/JP2017/030014.
Extended European Search Report for European Patent Application No. 17848561.1, dated Jan. 24, 2020, 13 pages.
(Continued)

*Primary Examiner* — Hau H Nguyen
(74) *Attorney, Agent, or Firm* — Sheridan Ross P.C.

(57) ABSTRACT

To perform inter-pixel image processing with lower latency and higher speed.
An image sensor includes: a pixel array unit in which pixels having a photoelectric conversion function are arranged in an array; an AD conversion unit configured to perform AD conversion processing on pixel signals output from the pixels in parallel for each column of the pixels of the pixel array unit; a memory unit configured to hold pixel signals of
(Continued)

any number of rows subjected to AD conversion in the AD conversion unit for each column of the pixels; an inter-pixel image processing unit configured to read pixel signals of any rows and columns from the memory unit, and perform computing between the pixel signals in parallel for each column of the pixels; and an output circuit configured to control output, to an outside, of pixel signals output from the AD conversion unit and pixel signals output from the inter-pixel image processing unit. The present technology can be applied to, for example, a CMOS image sensor.

17 Claims, 11 Drawing Sheets

(51) Int. Cl.
*H04N 5/374* (2011.01)
*H04N 5/378* (2011.01)
*G06T 1/60* (2006.01)

(56) References Cited

U.S. PATENT DOCUMENTS

| | | |
|---|---|---|
| 2014/0285697 A1* | 9/2014 | Nitta .................. H03M 1/1023 |
| | | 348/308 |
| 2015/0163403 A1 | 6/2015 | Wakabayashi |
| 2015/0212970 A1* | 7/2015 | Chevobbe ........... G06F 13/4009 |
| | | 710/105 |
| 2015/0288895 A1 | 10/2015 | Matsuya et al. |
| 2016/0088253 A1 | 3/2016 | Tezuka |
| 2019/0057495 A1* | 2/2019 | Shionoya ............... H04N 5/232 |

FOREIGN PATENT DOCUMENTS

| | | |
|---|---|---|
| JP | 2006-237772 | 9/2006 |
| JP | 2014-236183 | 12/2014 |
| JP | 2014-241458 | 12/2014 |
| WO | WO 2007/032006 | 3/2007 |
| WO | WO 2014/007004 | 1/2014 |

* cited by examiner

IMAGE SENSOR AND DRIVING METHOD, AND ELECTRONIC APPARATUS

CROSS REFERENCE TO RELATED APPLICATIONS

This application is a national stage application under 35 U.S.C. 371 and claims the benefit of PCT Application No. PCT/JP2017/030014 having an international filing date of 23 Aug. 2017, which designated the United States, which PCT application claimed the benefit of Japanese Patent Application No. 2016-175826 filed 8 Sep. 2016, the entire disclosures of each of which are incorporated herein by reference.

TECHNICAL FIELD

The present disclosure relates to an image sensor and a driving method, and an electronic apparatus, and particularly relates to an image sensor and a driving method, and an electronic apparatus that are capable of performing inter-pixel image processing with lower latency and higher speed.

BACKGROUND ART

Conventionally, for the purpose of performing processing such as authentication and recognition with higher speed and low latency, a vision chip obtained by integrating an imaging portion and an image processing portion of an image sensor onto a chip has been under research.

For example, an imaging device has been known in which, in regard to a plurality of pixels two-dimensionally arranged in a matrix and having a photoelectric conversion function, one image processing circuit is disposed for one pixel, and image processing is performed in parallel. In this imaging device, image processing can be performed with higher speed and low latency. However, an image processing circuit generally occupies a larger area than a pixel size, which makes it difficult to make a pixel portion for photoelectric conversion large; thus, it has been difficult to obtain sufficient sensitivity characteristics. In addition, an area of one unit pixel including an image processing circuit and a pixel is large, which makes it difficult to increase the number of pixels.

Hence, Patent Literature 1 discloses large-scale integration (LSI) for pattern signal processing that employs a configuration in which one processor element is made to correspond to one column of sensors. Employing this configuration can, for example, reduce the number of image processing circuits necessary for pixels, and relax limitations on the pixel size and the number of pixels as described above.

CITATION LIST

Patent Literature

Patent Literature 1: JP H7-62866B

DISCLOSURE OF INVENTION

Technical Problem

Incidentally, the technology disclosed in Patent Literature 1 described above has a configuration in which signal processing is performed by directly selecting pixel outputs by a multiplexer. Therefore, in this configuration, each time signal processing is performed, signal processing of one row is repeated after pixel outputs necessary for processing are scanned and selected; hence, image processing takes time, which makes it difficult to increase the speed of processing.

The present disclosure has been made in view of such circumstances, and makes it possible to perform inter-pixel image processing with lower latency and higher speed.

Solution to Problem

An image sensor according to an aspect of the present disclosure includes: a pixel array unit in which pixels having a photoelectric conversion function are arranged in an array; an AD conversion unit configured to perform analog-to-digital (AD) conversion processing on pixel signals output from the pixels in parallel for each column of the pixels of the pixel array unit; a memory unit configured to hold pixel signals of any number of rows subjected to AD conversion in the AD conversion unit for each column of the pixels; an inter-pixel image processing unit configured to read pixel signals of any rows and columns from the memory unit, and perform computing between the pixel signals in parallel for each column of the pixels; and an output circuit configured to control output, to an outside, of pixel signals output from the AD conversion unit and pixel signals output from the inter-pixel image processing unit.

A driving method according to an aspect of the present disclosure is a method for driving an image sensor including a pixel array unit in which pixels having a photoelectric conversion function are arranged in an array, an AD conversion unit configured to perform AD conversion processing on pixel signals output from the pixels in parallel for each column of the pixels of the pixel array unit, a memory unit configured to hold pixel signals of any number of rows subjected to AD conversion in the AD conversion unit for each column of the pixels, an inter-pixel image processing unit configured to read pixel signals of any rows and columns from the memory unit, and perform computing between the pixel signals in parallel for each column of the pixels, and an output circuit configured to control output, to an outside, of pixel signals output from the AD conversion unit and pixel signals output from the inter-pixel image processing unit, the method including: causing pixel reading processing of reading pixel signals from the pixel array unit out to the AD conversion unit, AD conversion processing on pixel signals performed by the AD conversion unit, inter-pixel image processing performed by the inter-pixel image processing unit, and data output processing of outputting data from the AD conversion unit and the inter-pixel image processing to operate in parallel.

An electronic apparatus according to an aspect of the present disclosure includes an image sensor including a pixel array unit in which pixels having a photoelectric conversion function are arranged in an array, an AD conversion unit configured to perform AD conversion processing on pixel signals output from the pixels in parallel for each column of the pixels of the pixel array unit, a memory unit configured to hold pixel signals of any number of rows subjected to AD conversion in the AD conversion unit for each column of the pixels, an inter-pixel image processing unit configured to read pixel signals of any rows and columns from the memory unit, and perform computing between the pixel signals in parallel for each column of the pixels, and an output circuit configured to control output, to an outside, of pixel signals output from the AD conversion unit and pixel signals output from the inter-pixel image processing unit.

In an aspect of the present disclosure, pixels having a photoelectric conversion function are arranged in an array in a pixel array unit. In an AD conversion unit, AD conversion processing on pixel signals output from the pixels is performed in parallel for each column of the pixels of the pixel array unit. In a memory unit, pixel signals of any number of rows subjected to AD conversion in the AD conversion unit are held for each column of the pixels. In an inter-pixel image processing unit, pixel signals of any rows and columns are read from the memory unit, and computing between the pixel signals is performed in parallel for each column of the pixels. In an output circuit, output, to an outside, of pixel signals output from the AD conversion unit and pixel signals output from the inter-pixel image processing unit is controlled.

Advantageous Effects of Invention

According to an aspect of the present disclosure, inter-pixel image processing can be performed with lower latency and higher speed.

MODE(S) FOR CARRYING OUT THE INVENTION

Hereinafter, specific embodiments to which the present technology is applied will be described in detail with reference to the drawings.

<First Configuration Example of Image Sensor>

Figure 1:
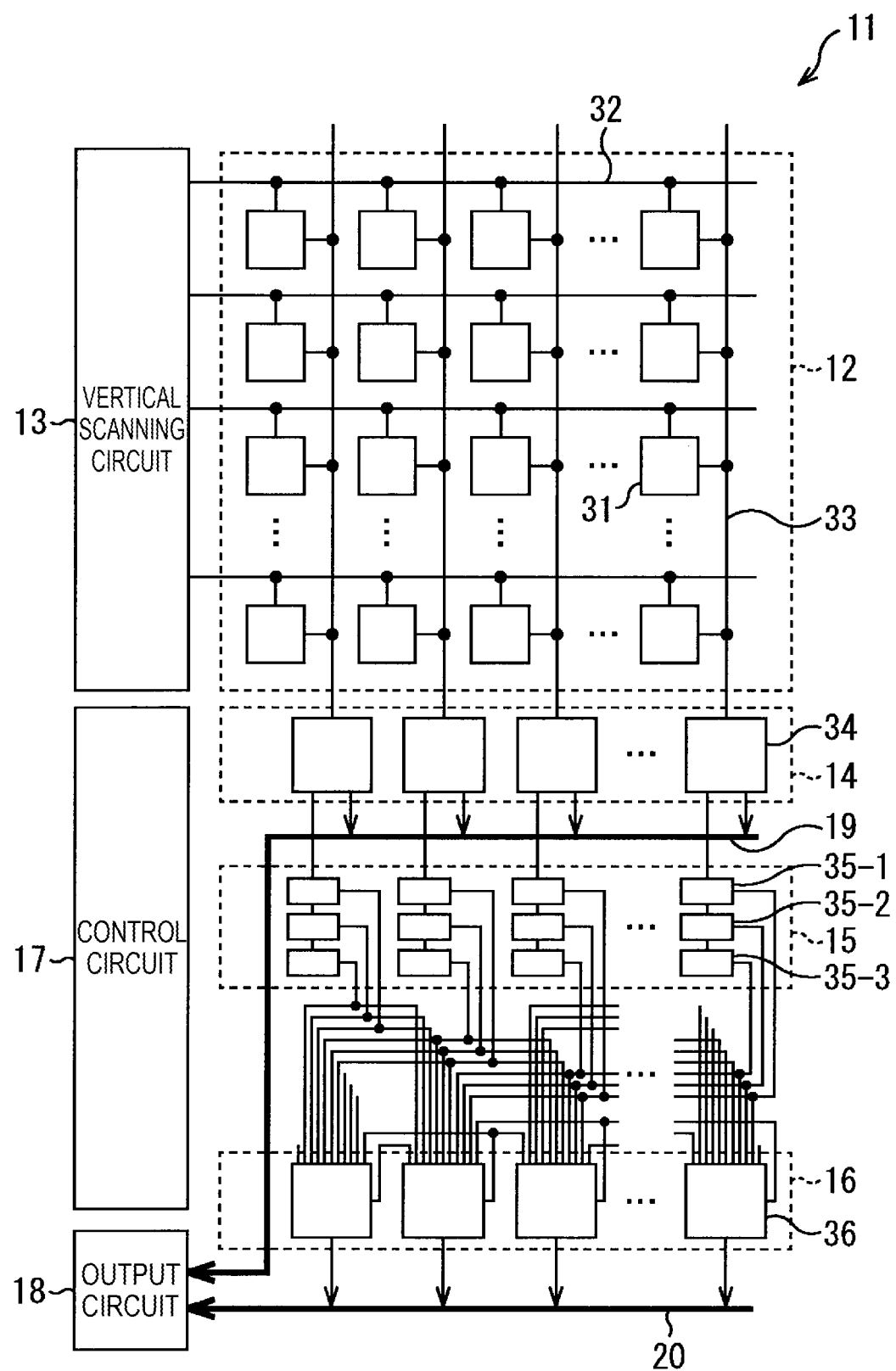
FIG. 1 is a block diagram illustrating a configuration example of a first embodiment of an image sensor to which the present technology is applied.

FIG. 1 is a block diagram illustrating a configuration example of a first embodiment of an image sensor to which the present technology is applied.

As illustrated in FIG. 1, an image sensor 11 includes a pixel array unit 12, a vertical scanning circuit 13, a column-parallel analog-to-digital (AD) conversion unit 14, a column-parallel memory unit 15, a column-parallel inter-pixel image processing unit 16, a control circuit 17, and an output circuit 18. For example, the image sensor 11 is a complementary metal oxide semiconductor (CMOS) image sensor. In addition, in the configuration example illustrated in FIG. 1, the image sensor 11 can perform inter-pixel image processing between a certain pixel 31 and other four pixels 31 adjacent in a vertical direction and a horizontal direction with respect to the pixel 31.

The pixel array unit 12 is a light-receiving surface that receives light collected by an optical system (not illustrated).

In the pixel array unit 12, a plurality of pixels 31 is two-dimensionally arranged in a matrix; the pixels 31 are connected to the vertical scanning circuit 13 via a row control line 32 for each row, and are connected to the column-parallel AD conversion unit 14 via a column signal line 33 for each column. Each of the plurality of pixels 31 has a photoelectric conversion function and outputs a pixel signal of a level corresponding to an amount of received light; an image of a subject formed on the pixel array unit 12 is constructed from the image signals.

The vertical scanning circuit 13 supplies various driving signals for driving the pixels 31 to the pixels 31 via the row control lines 32, sequentially for each row of the plurality of pixels 31 arranged in the pixel array unit 12, to control reading of pixel signals for each row of the pixels 31.

The column-parallel AD conversion unit 14 performs correlated double sampling (CDS) processing on pixel signals output from the plurality of pixels 31 via the column signal lines 33, thereby performing AD conversion on the pixel signals and reducing reset noise. That is, the column-parallel AD conversion unit 14 includes a plurality of AD conversion units 34 arranged in accordance with the number of columns of the pixels 31, and outputs digital signals obtained by performing AD conversion on pixel signals in parallel in the respective AD conversion units 34. In addition, pixel signals output from the column-parallel AD conversion unit 14 are supplied to the column-parallel memory unit 15, and supplied to the output circuit 18 via a bus 19.

Note that various circuit configurations can be applied to the column-parallel AD conversion unit 14; for example, it is preferable to apply a configuration based on a slope-type AD conversion circuit, because grayscale variability in AD conversion can be achieved easily by controlling a current source. For example, the column-parallel AD conversion unit 14, in accordance with control by the control circuit 17, can select grayscale variability in performing AD conversion on pixel signals output from the pixels 31 to be an appropriate grayscale corresponding to contents of image processing. For example, by reducing gray levels by the column-parallel AD conversion unit 14, the image sensor 11 can achieve further high-speed. image processing. Specifically, in the image sensor 11, AD conversion is performed with 12 bits in normal imaging, but performed with 4 bits in image processing; thus, slope-type AD conversion time is 1/256, and AD conversion time can be significantly shortened.

The column-parallel memory unit 15 holds digital pixel signals of any number of rows output from the column-parallel AD conversion unit 14. For example, the column-parallel memory unit 15 includes memory circuits 35 that are each capable of holding a pixel signal of one pixel and are arranged for each column of the pixels 31, the number of the memory circuits 35 corresponding to any number of rows. For example, in the case of a configuration in which the image sensor 11 performs inter-pixel image processing between a certain pixel 31 and other four pixels 31 adjacent in the vertical direction and the horizontal direction with respect to the pixel 31, as illustrated in FIG. 1, the column-parallel memory unit 15 includes three rows of memory circuits 35-1 to 35-3 for each column of the pixels 31.

The column-parallel inter-pixel image processing unit 16 can perform any column-parallel inter-pixel computing in parallel. For example, the column-parallel inter-pixel image processing unit 16 includes a plurality of inter-pixel image processing circuits 36 arranged in accordance with the number of columns of the pixels 31, and the column-parallel inter-pixel image processing unit 16 is connected to any plurality of rows and columns of memory circuits 35 of the column-parallel memory unit 15. Therefore, the column-parallel inter-pixel image processing unit 16 can perform image processing between any plurality of rows and columns of pixels 31 by the inter-pixel image processing circuits 36 for each column of the pixels 31 performing inter-pixel image processing in parallel.

For example, in the case of a configuration in which the image sensor 11 performs inter-pixel image processing between a certain pixel 31 and other four pixels 31 adjacent in the vertical direction and the horizontal direction with respect to the pixel 31, as illustrated in FIG. 1, to the column-parallel inter-pixel image processing unit 16 are connected memory circuits 35-1 to 35-3 of the column in which itself is disposed and two memory circuits 35-2 arranged in the left and right columns thereof. Then, the column-parallel inter-pixel image processing unit 16 can perform inter-pixel image processing between the memory circuit 35-2 of the column in which itself is disposed and the other four memory circuits 35 adjacent in the vertical direction and the horizontal direction with respect to the memory circuit 35-2. In addition, pixel signals subjected to inter-pixel image processing in the column-parallel inter-pixel image processing unit 16 are supplied to the output circuit 18 via a bus 20.

The control circuit 17 controls the pixel array unit 12, the column-parallel AD conversion unit 14, the column-parallel memory unit 15, and the column-parallel inter-pixel image processing unit 16.

The output circuit 18 controls output, to the outside of a chip, of pixel signals supplied from the column-parallel AD conversion unit 14 via the bus 19 and pixel signals supplied from the column-parallel inter-pixel image processing unit 16 via the bus 20. For example, the output circuit 18 can, in coordination with the vertical scanning circuit 13 and the control circuit 17, freely control pixel signals supplied from the column-parallel AD conversion unit 14 and pixel signals supplied from the column-parallel inter-pixel image processing unit 16, such as simultaneously outputting them, individually outputting them, or alternately outputting them.

The image sensor 11 is configured as described above, can cause the column-parallel AD conversion unit 14 and the column-parallel inter-pixel image processing unit 16 to operate in parallel, and can achieve inter-pixel image processing with high speed and low latency.

Note that in the image sensor 11 in FIG. 1, the column-parallel memory unit 15 includes three rows of memory circuits 35-1 to 35-3 for each column of the pixels 31, each being connected to the inter-pixel image processing circuits 36 in a necessary range. On the other hand, in the case where inter-pixel image processing in a wider range is necessary or the case where color filters are arranged in a Bayer array and image processing between pixels of the same color is necessary, the image sensor 11 can increase the number of rows of the memory circuits 35 and connections with the inter-pixel image processing circuits 36. Thus, the image sensor 11 can achieve inter-pixel image processing with appropriate memory size and connection configuration as necessary.

In addition, in the image sensor 11, the memory circuits 35 have flexibility in a column direction as well as the number of rows, and for example, can achieve inter-pixel image processing in a wide range without increasing connections with the inter-pixel image processing circuits 36, by thinning out columns. In addition, in the case where merely processing between remote pixels is necessary, it can be achieved by freely thinning out or adding reading of the pixels 31 itself, instead of increasing the memory circuits 35.

Note that a general-purpose memory such as a static random access memory (SRAM) or a dynamic random access memory (DRAM) can be used as the memory circuit 35, but a flip-flop circuit that is easy to control can also be used, because column-parallel input/output control is necessary.

Figure 2:
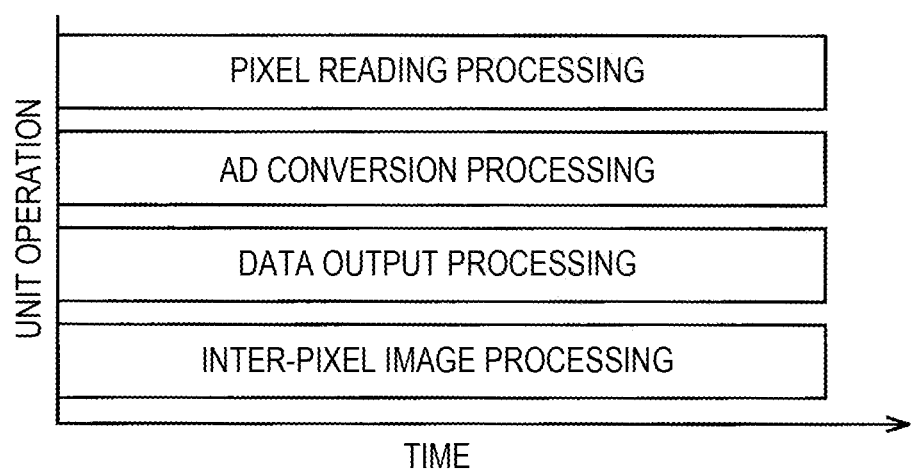
FIG. 2 illustrates an operation timing chart of an image sensor.

FIG. 2 illustrates an operation timing chart of the image sensor 11.

As illustrated in FIG. 2, the image sensor 11 can cause pixel reading processing of reading pixel signals from the pixel array unit 12 out to the column-parallel AD conversion unit 14, AD conversion processing on pixel signals performed by the column-parallel AD conversion unit 14, data output processing of outputting data from the column-parallel AD conversion unit 14 and the column-parallel inter-pixel image processing unit 16, and inter-pixel image processing performed by the column-parallel inter-pixel image processing unit 16 to operate in parallel. Thus, the image sensor 11 can achieve high-speed imaging by pixel reading processing, AD conversion processing, data output processing, and inter-pixel image processing being executed to operate in parallel in accordance with control by the control circuit 17.

That is, the image sensor 11 can cause the column-parallel AD conversion unit 14 and the column-parallel inter-pixel image processing unit 16 to operate in parallel via the column-parallel memory unit 15. Thus, the image sensor 11 can execute inter-pixel image processing performed by the column-parallel inter-pixel image processing unit 16, while keeping high processing speed substantially the same as that of AD conversion processing performed by the column-parallel AD conversion unit 14. That is, the image sensor 11 can achieve inter-pixel image processing with high speed and low latency, whose latency is extremely low to the extent of row processing time that enables the column-parallel inter-pixel image processing unit 16 to operate in parallel with AD conversion processing performed by the column-parallel AD conversion unit 14.

Note that in the case where inter-pixel image processing by the column-parallel inter-pixel image processing unit 16 is unnecessary, the image sensor 11 can have a function equivalent to that of a conventional imaging device including the column-parallel AD conversion unit 14, by putting the column-parallel inter-pixel image processing unit 16 on standby or interrupting power supply to it.

In addition, as illustrated in the timing chart in FIG. 2, actual operation speed of the image sensor 11 depends on parallel pieces of processing that operate in parallel. For example, in the case where each piece of processing is performed with 4 bits in the image sensor 11, also settling time dominating pixel reading processing of reading pixel signals from the pixel array unit 12 can be significantly shortened by being defined by precision of 4 bits. That is, in this case, necessary time precision can be relaxed as much as 256 times. Similarly, data output processing of outputting data from the output circuit 18 becomes 1/256 by data amount being reduced to 4 bits, and inter-pixel image processing performed by the column-parallel inter-pixel image processing unit 16 becomes 1/3 by computing in units of bits becoming 4 bits. Thus, the image sensor 11 can shorten parallel processing time in all pieces of processing, thereby achieving sensor operation and image processing at higher speed.

Furthermore, the image sensor 11 can reduce the circuit size of the memory circuit 35 and the inter-pixel image processing circuit 36 by reducing gray levels in image processing.

Figure 3:
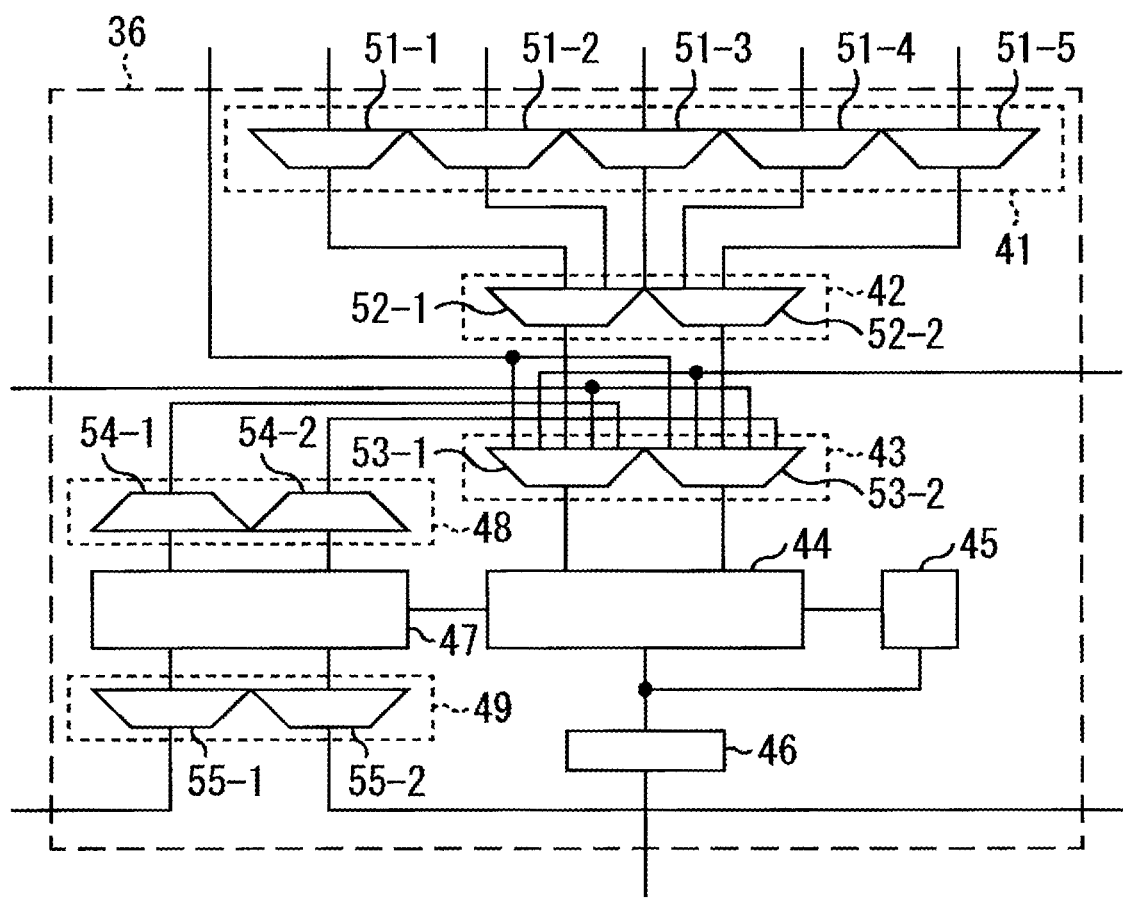
FIG. 3 is a block diagram illustrating a configuration example of an inter-pixel image processing circuit.

FIG. 3 is a block diagram illustrating a configuration example of the inter-pixel image processing circuit 36 in FIG. 1.

As illustrated in FIG. 3, the inter-pixel image processing circuit 36 includes a bit selection circuit unit 41, a pixel selection circuit unit 42, a computing selection circuit unit 43, a computing unit 44, a carry control unit 45, an output circuit unit 46, a working memory unit 47, a working memory internal selection circuit 48, and a working memory external selection circuit 49.

The bit selection circuit unit 41 selects any bit of a plurality of pixel signals. In the configuration example illustrated in FIG. 3, the bit selection circuit unit 41 includes five selectors 51-1 to 51-5. For example, to the bit selection circuit unit 41 are connected five memory circuits 35 in total, i.e., memory circuits 35-1 to 35-3 arranged in the same column and two memory circuits 35-2 arranged in the left and right columns. Therefore, the bit selection circuit unit 41 selects any bit of pixel signals held in the connected memory circuits 35 by the five selectors 51-1 to 51-5.

The pixel selection circuit unit 42 selects any pixel signal. In the configuration example illustrated in FIG. 3, the pixel selection circuit unit 42 includes two selectors 52-1 and 52-2. The selector 52-1 selects any pixel signal from among five pixel signals supplied via the bit selection circuit unit 41 and outputs the pixel signal, for example. The selector 52-2 selects a pixel signal to be subjected to computing with the pixel signal selected by the selector 52-1 and outputs the pixel signal, for example.

The computing selection circuit unit 43 selects a pixel signal to be supplied to the computing unit 44 from among a pixel signal input from the pixel selection circuit unit 42, a pixel signal input from the working memory internal selection circuit 48, a pixel signal input from another inter-pixel image processing circuit 36 (not illustrated), and a pixel signal directly input from the outside. In the configuration example illustrated in FIG. 3, the computing selection circuit unit 43 includes two selectors 53-1 and 53-2.

The selector 53-1 selects one of a pixel signal selected by the selector 52-1 of the pixel selection circuit unit 42, a pixel signal selected by a selector 54-1 of the working memory internal selection circuit 48, a pixel signal input from another inter-pixel image processing circuit 36 (not illustrated), and a pixel signal directly input from the outside, and supplies the pixel signal to the computing unit 44. Similarly, the selector 53-2 selects one of a pixel signal selected by the selector 52-2 of the pixel selection circuit unit 42, a pixel signal selected by a selector 54-2 of the working memory internal selection circuit 48, a pixel signal input from another inter-pixel image processing circuit 36 (not illustrated), and a pixel signal directly input from the outside, and supplies the pixel signal to the computing unit 44.

The computing unit 44 performs computing between pixel signals by using two pixel signals supplied from the computing selection circuit unit 43, and performs output.

The carry control unit 45 performs carry control when the computing unit 44 performs computing.

The output circuit unit 46 temporarily holds a pixel signal output from the computing unit 44, thereby enabling computing and output to operate in parallel.

The working memory unit 47 temporarily holds a pixel signal output from the computing unit 44 so that the pixel signal can be used when computing using the pixel signal is performed again.

The working memory internal selection circuit 48 selects and outputs a pixel signal held in the working memory unit 47 for computing inside the inter-pixel image processing circuit 36. In the configuration example illustrated in FIG. 3, the working memory internal selection circuit 48 includes the two selectors 54-1 and 54-2. The selector 54-1 supplies the selected pixel signal to the selector 53-1 of the computing selection circuit unit 43, and the selector 54-2 supplies the selected pixel signal to the selector 53-2 of the computing selection circuit unit 43.

The working memory external selection circuit 49 selects and outputs a pixel signal held in the working memory unit 47 for computing with another inter-pixel image processing circuit 36 (not illustrated). In the configuration example illustrated in FIG. 3, the working memory external selection circuit 49 includes two selectors 55-1 and 55-2. The selector 55-1 supplies the selected pixel signal to the selector 531 of the computing selection circuit unit 43 of the other inter-pixel image processing circuit 36 (not illustrated), and the selector 54-2 supplies the selected pixel signal to the selector 53-2 of the computing selection circuit unit 43 of the other inter-pixel image processing circuit 36 (not illustrated).

The column-parallel inter-pixel image processing unit 16 includes the plurality of inter-pixel image processing circuits 36 configured as described above, and with the connection configuration with the column-parallel memory unit 15, can perform any one-dimensional or two-dimensional inter-pixel image processing. For example, the column-parallel inter-pixel image processing unit 16 can perform any convolution operation processing, such as smoothing or edge extraction, and feature value extraction, such as corner extraction.

In addition, the image sensor 11 in the configuration example illustrated in FIG. 1 premises performing inter-pixel image processing using a certain pixel 31 and other four pixels 31 adjacent in the vertical direction and the horizontal direction with respect to the pixel 31. Therefore, the bit selection circuit unit 41 has a configuration including five selectors 51-1 to 51-5, but the number of selectors 51 included in the bit selection circuit unit 41 can be increased so as to correspond to the column-parallel AD conversion unit 14 as necessary. Thus, the image sensor 11 can perform image processing between neighboring pixels in a wider range.

In addition, the computing unit 44 can have a simple basic configuration including an adder and a logical operation circuit, because it performs bit serial 2-input computing. For example, the computing unit 44 can have a single instruction/multiple data (SIMD)-type parallel computing function suitable for high-speed parallel processing.

An example of output control of the image sensor 11 is described with reference to the timing chart illustrated in FIG. 4.

Figure 4:
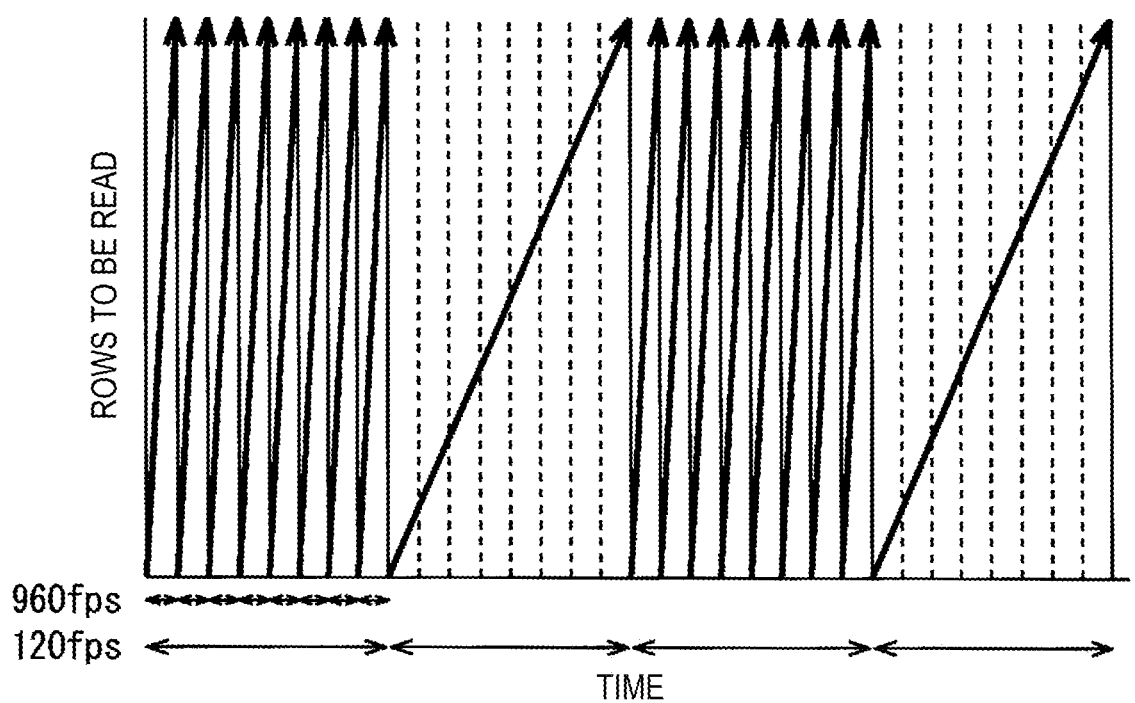
FIG. 4 illustrates an example of output control.

As illustrated in FIG. 4, the image sensor 11 can alternately perform output of images at a normal speed of 120 frames per second (fps) and output of images at a high speed of 960 fps. That is, the output circuit 18 alternately performs output control for outputting pixel signals output from the column-parallel AD conversion unit 14 at 120 fps and output control for outputting pixel signals output from the column-parallel inter-pixel image processing unit 16 at 960 fps. Thus, the image sensor 11 can output images subjected to high-speed image processing at 960 fps in the background, while continuously outputting normal images corresponding to 60 fps.

In addition, the output circuit 18 can perform integral or statistical processing, such as moment computing or histogram processing, for example, at any time by using all or part of outputs of the column-parallel AD conversion unit 14 and the column-parallel inter-pixel image processing unit 16. Then, the image sensor 11 can output pixel signals subjected to the processing.

As described above, the image sensor 11 can cause output of the column-parallel AD conversion unit 14 and output of the column-parallel inter-pixel image processing unit 16 to be performed in parallel by having a configuration in which the column-parallel AD conversion unit 14 and the column-parallel memory unit 15 are provided to precede the column-parallel inter-pixel image processing unit 16. Thus, the image sensor 11 can achieve inter-pixel image processing with low latency and high speed, which has been impossible in conventional column-parallel image processing, while keeping an advantage that no constraints are placed on the pixel array unit 12 and the column-parallel AD conversion unit 14.

<Second Configuration Example of Image Sensor>

Figure 5:
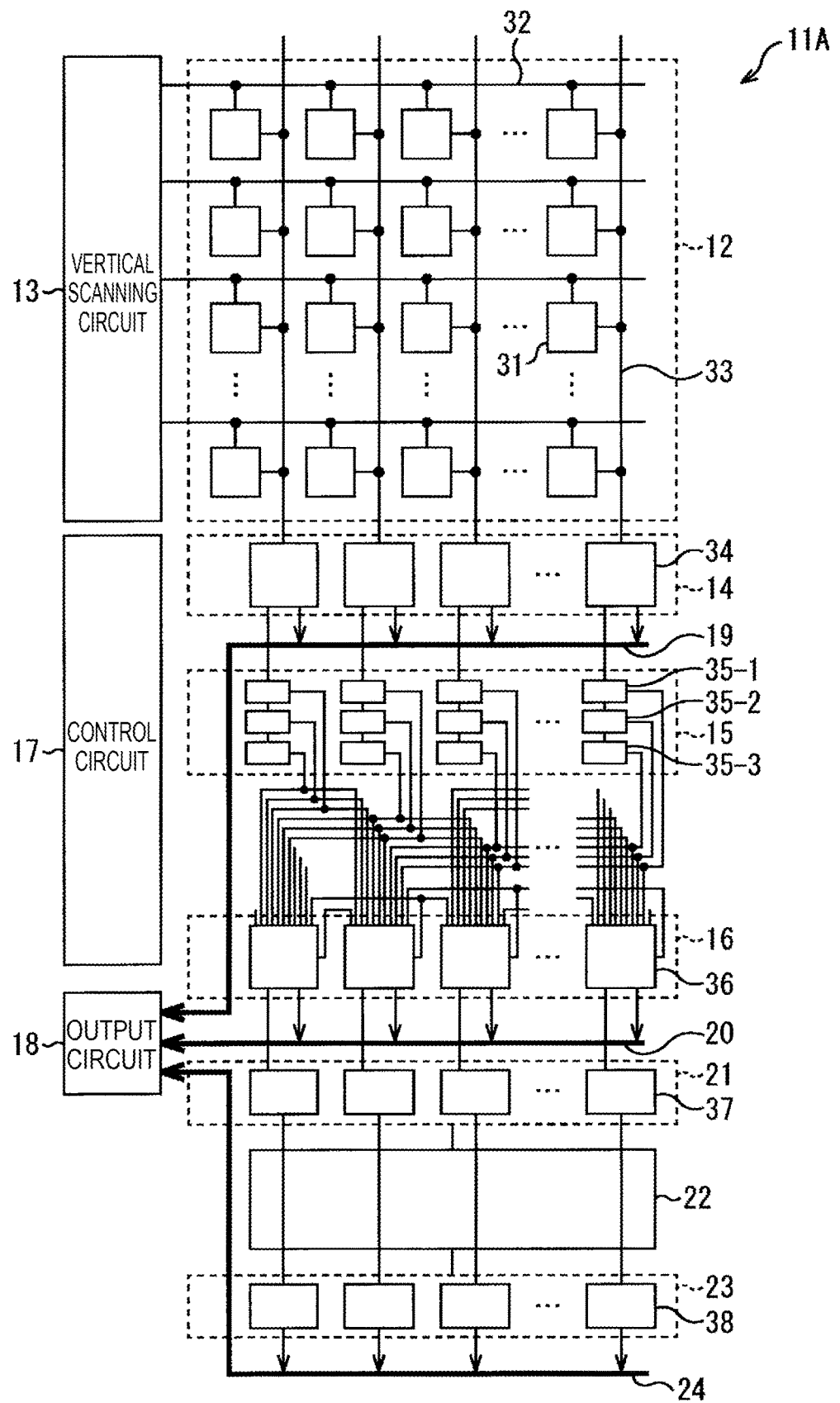
FIG. 5 is a block diagram illustrating a configuration example of a second embodiment of an image sensor.

FIG. 5 is a block diagram illustrating a second configuration example of an image sensor. Note that in an image sensor 11A illustrated in FIG. 5, components common to the image sensor 11 in FIG. 1 are denoted by the same reference numerals, and detailed description thereof is omitted.

That is, as illustrated in FIG. 5, the image sensor 11A is similar to the image sensor 11 in FIG. 1 in that the pixel array unit 12, the vertical scanning circuit 13, the column-parallel AD conversion unit 14, the column-parallel memory unit 15, the column-parallel inter-pixel image processing unit 16, the control circuit 17, and the output circuit 18 are provided.

Moreover, the image sensor 11A further includes a column-parallel grayscale conversion unit 21, a frame memory unit 22, and a column-parallel inter-frame image processing unit 23.

The column-parallel grayscale conversion unit 21 can perform grayscale conversion processing based on any threshold, in parallel for each column, on pixel signals subjected to column-parallel inter-pixel image processing in the column-parallel inter-pixel image processing unit 16. That is, the column-parallel grayscale conversion unit 21 includes a plurality of grayscale conversion circuits 37 arranged in accordance with the number of columns of the pixels 31, and the grayscale conversion circuit 37 performs grayscale conversion on a pixel signal output from the inter-pixel image processing circuit 36 of the corresponding column, and outputs the resulting pixel signal.

In addition, the column-parallel grayscale conversion unit 21, in accordance with control by the control circuit 17, can change a grayscale when a grayscale of a pixel signal is changed. At this time, a variable range in which the column-parallel AD conversion unit 14 changes a grayscale is set to be equal to or greater than a variable range in which the column-parallel grayscale conversion unit 21 changes a grayscale.

The frame memory unit 22 holds one frame of pixel signals subjected to grayscale conversion and output by the column-parallel grayscale conversion unit 21.

The column-parallel inter-frame image processing unit 23 performs inter-frame image processing by using an image based on pixel signals output from the column-parallel grayscale conversion unit 21 and an image based on pixel signals of the immediately preceding frame held in the frame memory unit 22. That is, the column-parallel inter-frame image processing unit 23 includes a plurality of inter-frame image processing circuits 38 arranged in accordance with the number of columns of the pixels 31, and the inter-frame image processing circuits 38 perform signal processing between an image of the current frame and an image of the immediately preceding frame in a column-parallel manner. By performing such inter-frame image processing, the column-parallel inter-frame image processing unit 23 can, for example, detect a motion of a subject between frames.

In the image sensor 11A configured as described above, as in the image sensor 11 in FIG. 1, the control circuit 17 can cause pixel reading processing, AD conversion processing, data output processing, and inter-pixel image processing to operate in parallel, and also can cause inter-frame image processing performed by the column-parallel inter-frame image processing unit 23 to operate in parallel. That is, the image sensor 11A can cause inter-frame image processing performed by the column-parallel inter-frame image processing unit 23 to operate in parallel with AD conversion processing of the column-parallel AD conversion unit 14 (FIG. 2) via the frame memory unit 22. Thus, the image sensor 11A can perform inter-pixel image processing and inter-frame image processing with high speed and low delay.

Furthermore, the image sensor 11A can perform inter-frame image processing by the column-parallel inter-frame image processing unit 23 by using an image subjected to appropriate pre-filtering processing such as denoising by the column-parallel inter-pixel image processing unit 16. Thus, the image sensor 11A can suppress occurrence of wrong recognition, and achieve inter-frame image processing with higher precision.

Furthermore, like the image sensor 11 in FIG. 1, the image sensor 11A can be treated as being equivalent to a conventional imaging device by putting the column-parallel inter-frame image processing unit 23 on standby or interrupting power supply to it, in the case where inter-frame image processing by the column-parallel inter-frame image processing unit 23 is unnecessary.

In addition, in the image sensor 11A, the column-parallel grayscale conversion unit 21 reduces gray levels to a range necessary in inter-frame image processing of the column-parallel inter-frame image processing unit 23. After that, in the image sensor 11A, the column-parallel inter-frame image processing unit 23 performs inter-frame image processing by using pixel signals with reduced gray levels of the immediately preceding frame held in the frame memory unit 22 and pixel signals with reduced gray levels of the current frame. By such processing, the image sensor 11A can achieve inter-frame image processing with the frame memory unit 22 having a configuration of minimum capacity.

Here, it is also possible for the frame memory unit 22 to include a flip-flop circuit. However, the frame memory unit 22 has larger capacity than the column-parallel memory unit 15 of the image sensor 11 in FIG. 1, and therefore preferably includes a general-purpose memory such as a SRAM or a DRAM. Moreover, it is practical for the frame memory unit 22 to include a flip-flop circuit of minimum capacity necessary for temporary work in column-parallel processing.

In addition, the inter-frame image processing circuit 38 can employ a configuration similar to that of the inter-pixel image processing circuit 36 described with reference to FIG. 3. Note that in the case where the inter-frame image processing circuit 38 is specialized for simple processing, such as detecting whether or not there is a motion of a subject between frames, a simple configuration based on a logical operation circuit can be used.

In addition, in the image sensor 11A, the column-parallel inter-frame image processing unit 23 is connected to the output circuit 18 via a bus 24. Therefore, for example, the output circuit 18 can, in coordination with the vertical scanning circuit 13 and the control circuit 17, freely control pixel signals supplied from the column-parallel AD conversion unit 14, pixel signals supplied from the column-parallel inter-pixel image processing unit 16, and pixel signals output from the column-parallel inter-frame image processing unit 23, such as simultaneously outputting them, individually outputting them, or alternately outputting them.

As described above, the image sensor 11A has a configuration in which, in addition to the configuration of the image sensor 11 in FIG. 1, the column-parallel grayscale conversion unit 21, the frame memory unit 22, and the column-parallel inter-frame image processing unit 23 are provided to follow the column-parallel inter-pixel image processing unit 16. Thus, the image sensor 11A can achieve inter-frame image processing with high speed and low delay, in addition to inter-pixel image processing, with a minimum amount of memory. Furthermore, the image sensor 11A can, while enabling normal imaging, achieve further high-speed column-parallel image processing when gray levels are reduced.

<Third Configuration Example of Image Sensor>

Figure 6:
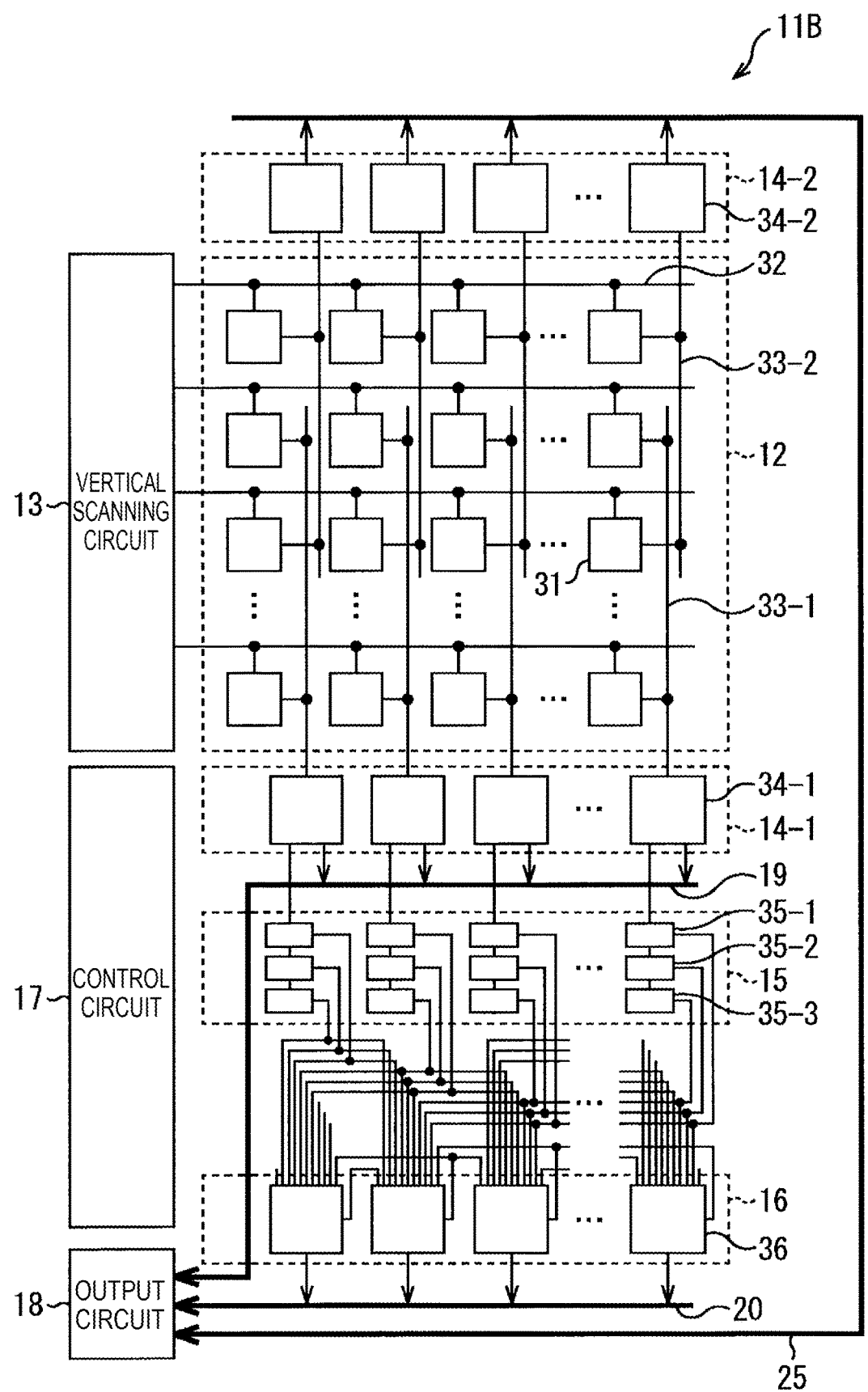
FIG. 6 is a block diagram illustrating a configuration example of a third embodiment of an image sensor.

FIG. 6 is a block diagram illustrating a third configuration example of an image sensor. Note that in an image sensor 11B illustrated in FIG. 6, components common to the image sensor 11 in FIG. 1 are denoted by the same reference numerals, and detailed description thereof is omitted.

That is, as illustrated in FIG. 6, the image sensor 11B is similar to the image sensor 11 in FIG. 1 in that the pixel array unit 12, the vertical scanning circuit 13, the column-parallel memory unit 15, the column-parallel inter-pixel image processing unit 16, the control circuit 17, and the output circuit 18 are provided.

Moreover, the image sensor 11B has a configuration in which a column-parallel AD conversion unit 14-1 is disposed below the pixel array unit 12 in the vertical direction and a column-parallel AD conversion unit 14-2 is disposed above the pixel array unit 12 in the vertical direction. Then, in the image sensor 11B, for example, pixels 31 of odd-numbered rows of the pixel array unit 12 are connected to the column-parallel AD conversion unit 14-1 via column signal lines 33-1, and pixels 31 of even-numbered rows of the pixel array unit 12 are connected to the column-parallel AD conversion unit 14-2 via column signal lines 33-2.

The column-parallel AD conversion unit 14-1 includes AD conversion units 34-1, the number of which corresponds to the pixels 31 of the odd-numbered rows of the pixel array unit 12, and supplies digital signals obtained by performing AD conversion on pixel signals in parallel in the respective AD conversion units 34-1 to the output circuit 18 via the bus 19.

The column-parallel AD conversion unit 14-2 includes AD conversion units 34-2, the number of which corresponds to the pixels 31 of the even-numbered rows of the pixel array unit 12, and supplies digital signals obtained by performing AD conversion on pixel signals in parallel in the respective AD conversion units 34-2 to the output circuit 18 via a bus 25. The column-parallel AD conversion unit 14-1 and the column-parallel AD conversion unit 14-2 preferably have equivalent performance.

In addition, in the image sensor 11B, while the column-parallel AD conversion unit 14-2 is performing AD conversion on pixel signals of one row with a first grayscale, the column-parallel AD conversion unit 14-1 performs AD conversion on pixel signals of one row with a second grayscale smaller than the first grayscale.

Thus, the image sensor 11B has a configuration in which the column-parallel AD conversion unit 14-1 and the column-parallel AD conversion unit 14-2 are arranged to face the pixel array unit 12. Note that, for example, a configuration in which the column-parallel AD conversion unit 14-1 and the column-parallel AD conversion unit 14-2 are arranged on the same side with respect to the pixel array unit 12 may be used, in which case routing of the bus 25 can be shortened.

In addition, the output circuit 18 can perform integral or statistical processing, such as moment computing or histogram processing, for example, at any time by using all or part of outputs of the column-parallel AD conversion units 14-1 and 14-2 and the column-parallel inter-pixel image processing unit 16. Then, the image sensor 11B can output pixel signals subjected to the processing.

In the image sensor 11B configured as described above, as in the image sensor 11 in FIG. 1, the control circuit 17 can cause pixel reading processing, AD conversion processing performed by the column-parallel AD conversion units 14-1 and 14-2, data output processing, and inter-pixel image processing to operate in parallel. Thus, for example, the output circuit 18 can, in coordination with the vertical scanning circuit 13 and the control circuit 17, freely control pixel signals supplied from the column-parallel AD conversion units 14-1 and 14-2, pixel signals supplied from the column-parallel inter-pixel image processing unit 16, and pixel signals output from the column-parallel inter-frame image processing unit 23, such as simultaneously outputting them, individually outputting them, or alternately outputting them.

An example of output control of the image sensor 11B is described with reference to the timing chart illustrated in FIG. 7.

Figure 7:
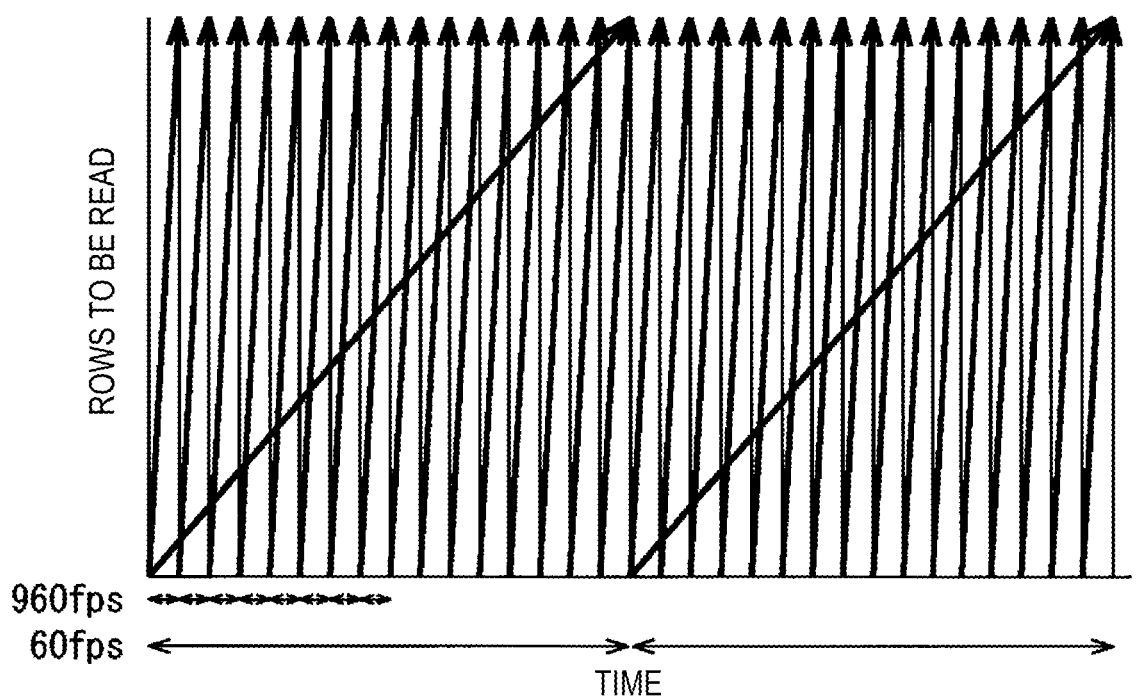
FIG. 7 illustrates an example of output control.

As illustrated in FIG. 7, the image sensor 11B can perform output of images at a normal speed of 60 fps and output of images at a high speed of 960 fps concurrently in parallel. That is, the output circuit 18 concurrently performs output control for outputting pixel signals output from the column-parallel AD conversion unit 14-2 at 60 fps and output control for outputting pixel signals output from the column-parallel inter-pixel image processing unit 16 via the column-parallel AD conversion unit 14-1 at 960 fps.

In addition, for example, in the case of not performing image processing by the column-parallel inter-pixel image processing unit 16, the image sensor 11B can continuously output normal images corresponding to 60 fps. Moreover, in the case of performing image processing by the column-parallel inter-pixel image processing unit 16, images subjected to high-speed image processing at 960 fps can be output concurrently in parallel with output of normal images corresponding to 60 fps.

Note that the image sensor 119 can have a configuration in which blocks equivalent to the column-parallel memory unit 15 and the column-parallel inter-pixel image processing unit 16 are arranged on the output side of the column-parallel AD conversion unit 14-2, as on the output side of the column-parallel AD conversion unit 14-1. Employing this configuration for the image sensor 11B can achieve further high-speed image processing, though a circuit area is increased.

Furthermore, increasing blocks that perform processing in a column-parallel manner by arranging them in cascaded multiple stages or the like, the image sensor 11B can achieve further high-speed image processing, though a circuit area and power consumption are traded off.

<Fourth Configuration Example of Image Sensor>

Figure 8:
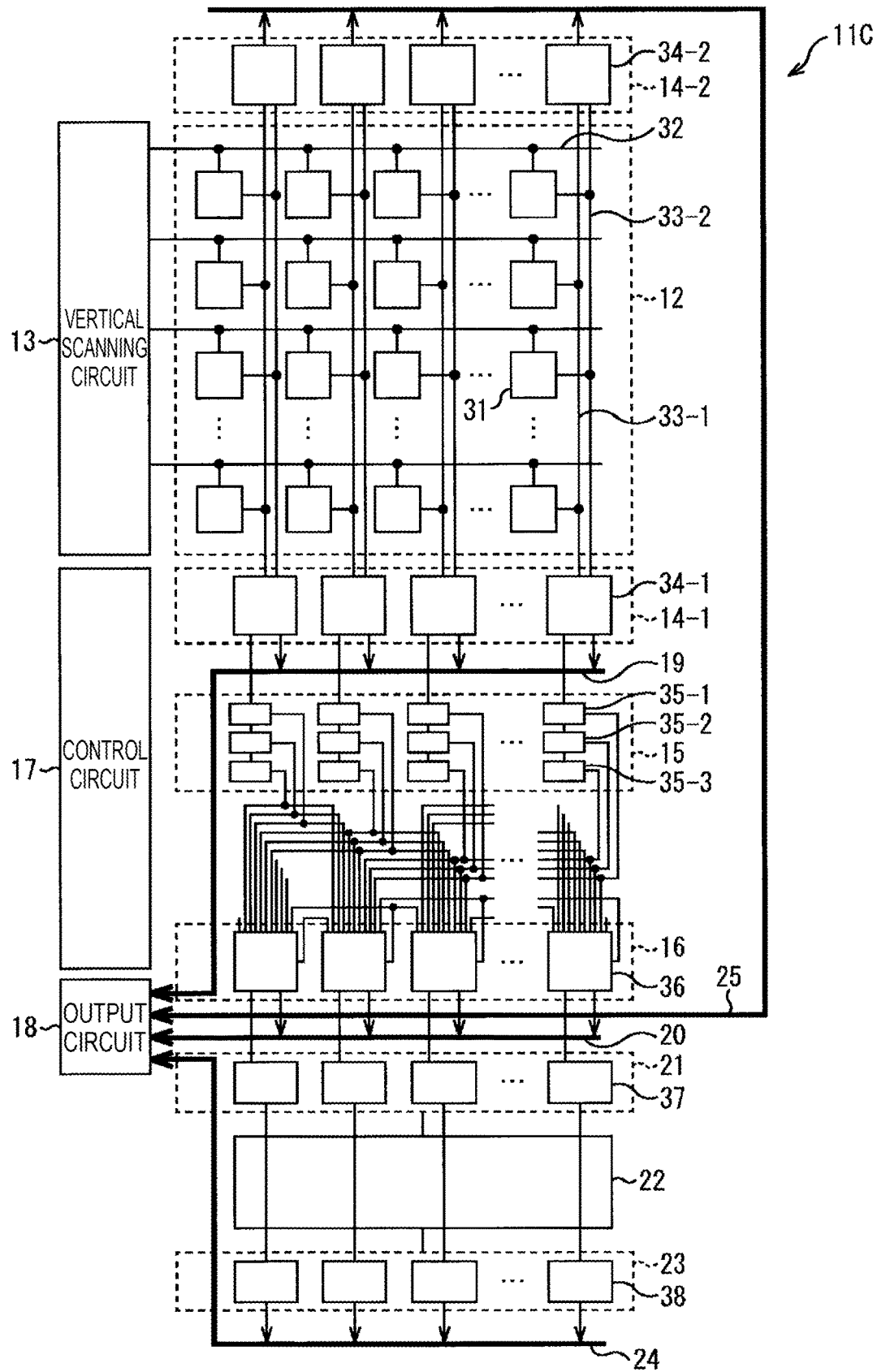
FIG. 8 is a block diagram illustrating a configuration example of a fourth embodiment of an image sensor.

FIG. 8 is a block diagram illustrating a fourth configuration example of an image sensor. Note that in an image sensor 11C illustrated in FIG. 8, components common to the image sensor 11A in FIG. 5 and the image sensor 119 in FIG. 6 are denoted by the same reference numerals, and detailed description thereof is omitted.

That is, as illustrated in FIG. 8, the image sensor 11C has the configurations of the image sensor 11A in FIG. 5 and the image sensor 11B in FIG. 6. In other words, the image sensor 11C includes the pixel array unit 12, the vertical scanning circuit 13, the column-parallel AD conversion units 14-1 and 14-2, the column-parallel memory unit 15, the column-parallel inter-pixel image processing unit 16, the control circuit 17, the output circuit 18, the column-parallel grayscale conversion unit 21, the frame memory unit 22, and the column-parallel inter-frame image processing unit 23.

The image sensor 11C configured as described above can execute inter-frame image processing in a column-parallel manner, like the image sensor 11A in FIG. 5, and also can perform output of images at a normal speed of 60 fps and output of images at a high speed of 960 fps concurrently in parallel, like the image sensor 11B in FIG. 6.

<Fifth Configuration Example of Image Sensor>

Figure 9:
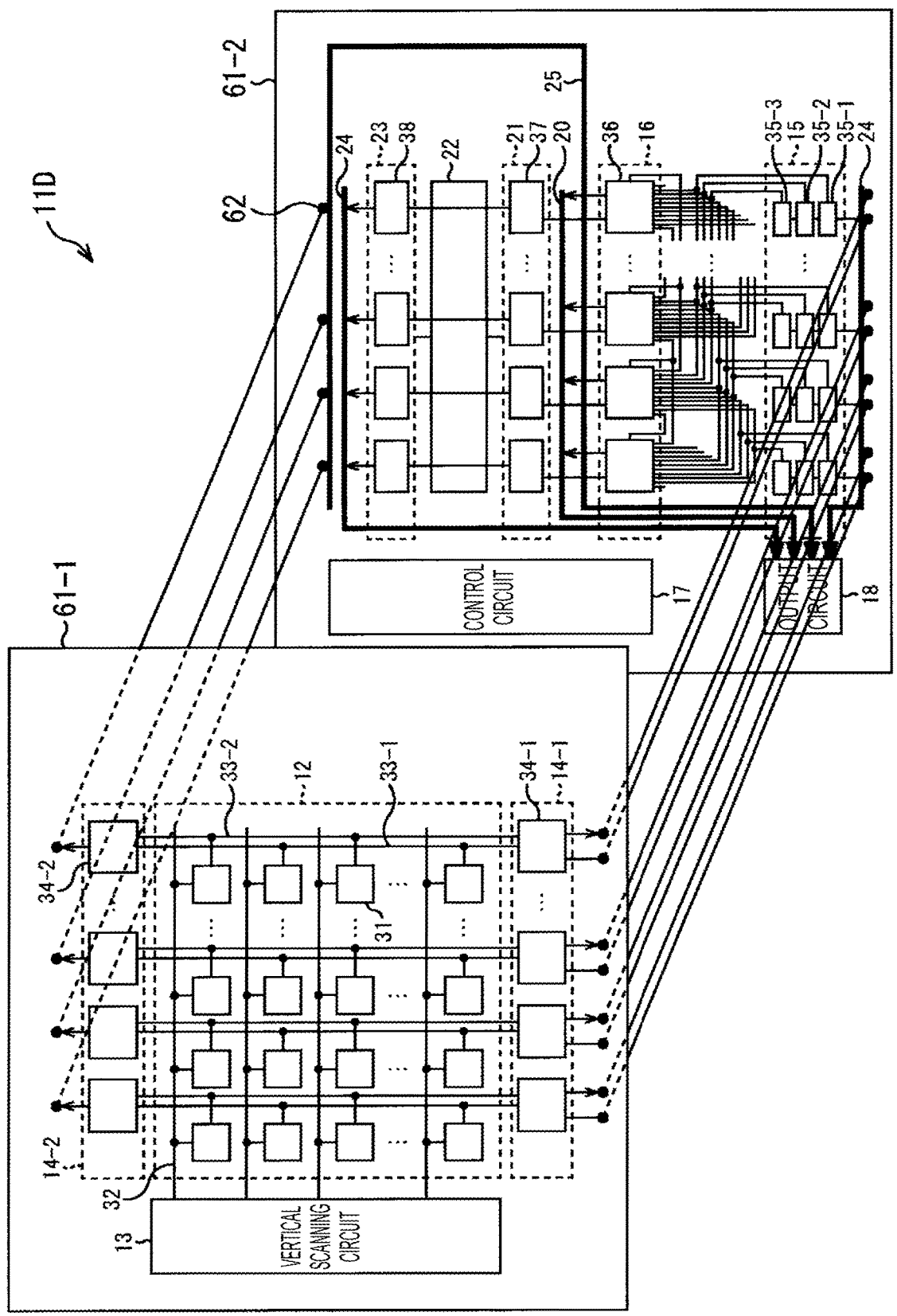
FIG. 9 is a block diagram illustrating a configuration example of a fifth embodiment of an image sensor.

FIG. 9 is a block diagram illustrating a fifth configuration example of an image sensor. Note that in an image sensor 11D illustrated in FIG. 9, components common to the image sensor 11C in FIG. 8 are denoted by the same reference numerals, and detailed description thereof is omitted.

That is, like the image sensor 11C, the image sensor 11D includes the pixel array unit 12, the vertical scanning circuit 13, the column-parallel AD conversion units 14-1 and 14-2, the column-parallel memory unit 15, the column-parallel inter-pixel image processing unit 16, the control circuit 17, the output circuit 18, the column-parallel grayscale conversion unit 21, the frame memory unit 22, and the column-parallel inter-frame image processing unit 23.

Moreover, the image sensor 11D has a stacked structure in which two layers of a semiconductor chip 61-1 and a semiconductor chip 61-2 are stacked, and wiring between the semiconductor chip 61-1 and the semiconductor chip 61-2 is joined by a connection portion 62. For example, on the semiconductor chip 61-1 are arranged the pixel array unit 12, the vertical scanning circuit 13, and the column-parallel AD conversion units 14-1 and 14-2. In addition, on the semiconductor chip 61-2 are arranged the column-parallel memory unit 15, the column-parallel inter-pixel image processing unit 16, the control circuit 17, the output circuit 18, the column-parallel grayscale conversion unit 21, the frame memory unit 22, and the column-parallel inter-frame image processing unit 23.

The image sensor 11D configured as described above has an arrangement forming a stacked structure in which a column-parallel circuit portion (the column-parallel memory unit 15, the column-parallel inter-pixel image processing unit 16, the control circuit 17, the output circuit 18, the column-parallel grayscale conversion unit 21, the frame memory unit 22, the column-parallel inter-frame image processing unit 23, and the like) is folded back against the pixel array unit 12. Thus, the image sensor 11D can be significantly reduced in chip size as compared with a vertically long configuration in which a column-parallel circuit portion is strung out from the pixel array unit 12.

In addition, as illustrated in the drawing, the image sensor 11D has a configuration in which the column-parallel circuit portion is collected on the semiconductor chip 61-2, separately from the semiconductor chip 61-1 including the pixel array unit 12. Thus, the image sensor 11D can use a leading-edge logic process independent of pixel and analog techniques in the semiconductor chip 61-2, which is advantageous in area efficiency and routing of signal lines.

Furthermore, the image sensor 11D has a configuration in which outputs of the column-parallel AD conversion units 14-1 and 14-2 are connected to the semiconductor chip 61-2. On the other hand, for example, a configuration in which another output is connected to the semiconductor chip 61-2 can be used, in accordance with area balance between the semiconductor chip 61-1 and the semiconductor chip 61-2 or a chip process. In addition, other circuit arrangements of the image sensor 11D are also not limited to the configuration example in FIG. 9.

In addition, in the image sensor 11D, the connection portion 62 can employ various methods such as a bump joint using a solder technique or a substrate-penetrating electrode to which a semiconductor process is applied, for example, and is not limited to a specific method.

Furthermore, the image sensor 11D is not limited to a stacked structure of two chips of the semiconductor chip 61-1 and the semiconductor chip 61-2. For example, in the case of using the frame memory unit 22 with a large capacity, or the like, a stacked structure of three chips can be employed in which a process chip suitable for a large-capacity memory such as a DRAM is sandwiched between the semiconductor chip 61-1 and the semiconductor chip 61-2. That is, the image sensor 11D can have a configuration in which the column-parallel memory unit 15, the column-parallel inter-pixel image processing unit 16, the control circuit 17, the output circuit 18, the column-parallel grayscale conversion unit 21, and the column-parallel inter-frame image processing unit 23 are arranged on the third layer of semiconductor chip.

Note that the above-described image sensor 11 can be applied to, for example, various electronic apparatuses, such as imaging systems (e.g., digital still cameras and digital video cameras), mobile phones with an imaging function, or other apparatuses with an imaging function.

<Configuration Example of Imaging Device>

Figure 10:
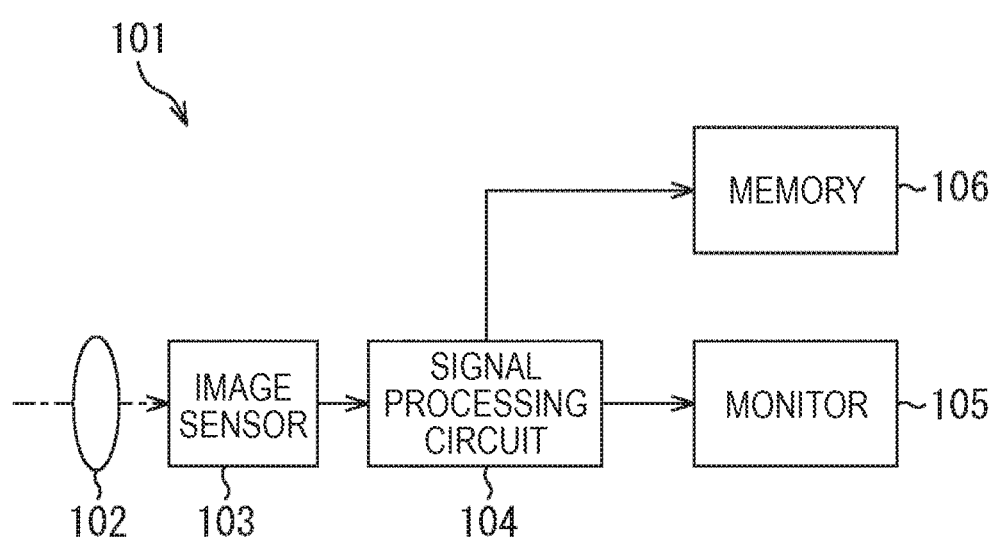
FIG. 10 is a block diagram illustrating a configuration example of an imaging device.

FIG. 10 is a block diagram illustrating a configuration example of an imaging device mounted on an electronic apparatus.

As illustrated in FIG. 10, an imaging device 101 includes an optical system 102, an image sensor 103, a signal processing circuit 104, a monitor 105, and a memory 106, and can capture still images and moving images.

The optical system 102 includes one or a plurality of lenses, and guides image light (incident light) from a subject to the image sensor 103 to form an image on a light-receiving surface (pixel array unit) of the image sensor 103.

The above-described image sensor 11 is used as the image sensor 103. Electrons are accumulated in the image sensor 103 for a certain period, in accordance with the image formed on the light-receiving surface through the optical system 102. Then, signals corresponding to the electrons accumulated in the image sensor 103 are supplied to the signal processing circuit 104.

The signal processing circuit 104 performs various kinds of signal processing on pixel signals output from the image sensor 103. An image (image data) obtained by the signal processing circuit 104 performing signal processing is supplied to the monitor 105 to be displayed, or supplied to the memory 106 to be stored (recorded).

In the imaging device 101 with such a configuration, an image subjected to inter-pixel image processing with lower latency and higher speed can be captured, for example, by using the above-described image sensor 11.

<Usage Examples of Image Sensor>

Figure 11:
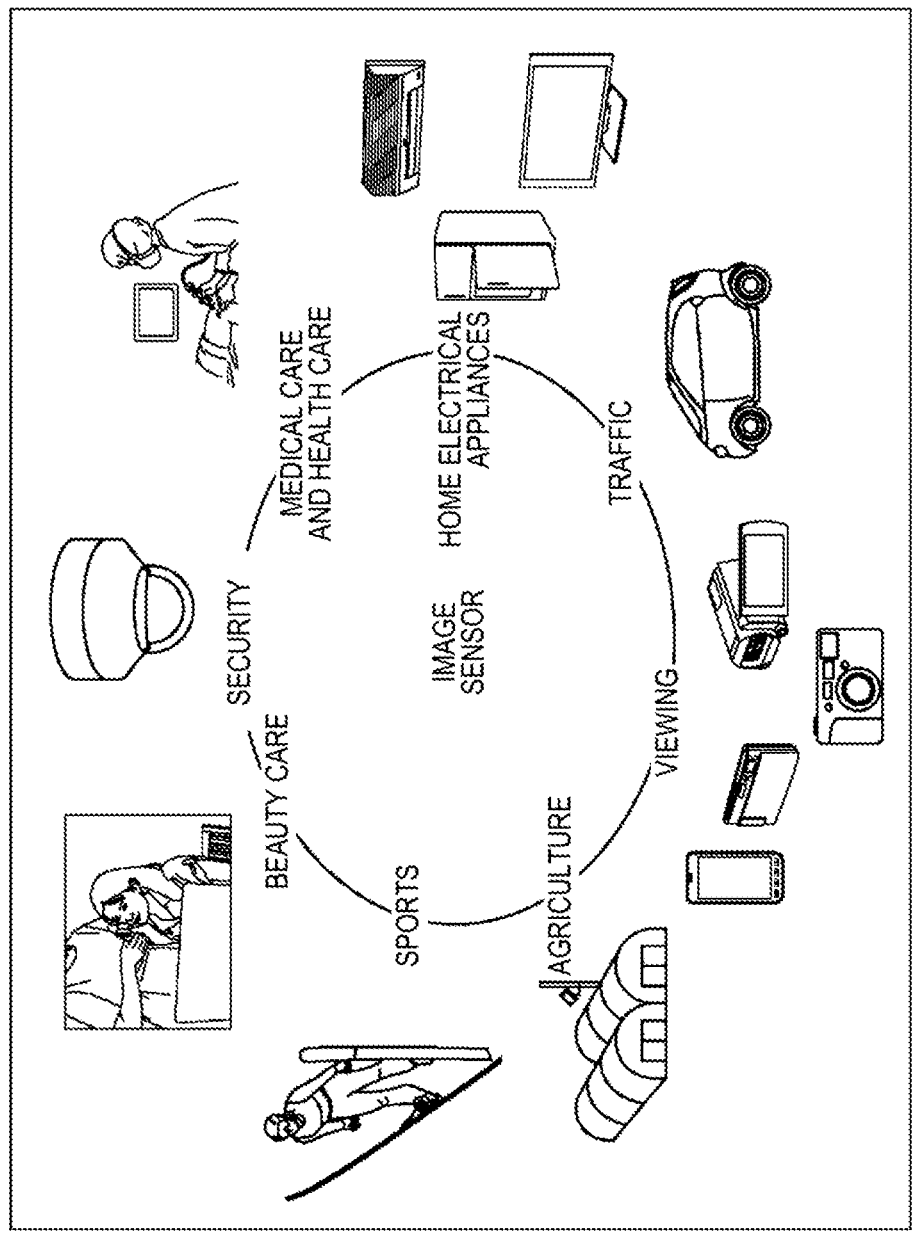
FIG. 11 illustrates usage examples of an image sensor.

FIG. 11 illustrates the usage examples of the above-described image sensor (the image sensor 11).

The above-described image sensor can be used for, for example, various cases in which light such as visible light, infrared light, ultraviolet light, or X-rays is detected as follows.

Devices that take images used for viewing, such as a digital camera and a portable appliance with a camera function.

Devices used for traffic, such as an in-vehicle sensor that takes images of the front and the back of a car, surroundings, the inside of the car, and the like, a monitoring camera that monitors travelling vehicles and roads, and a distance sensor that measures distances between vehicles and the like, which are used for safe driving (e.g., automatic stop), recognition of the condition of a driver, and the like.

Devices used for home electrical appliances, such as a TV, a refrigerator, and an air conditioner, to takes images of a gesture of a user and perform appliance operation in accordance with the gesture.

Devices used for medical care and health care, such as an endoscope and a device that performs angiography by reception of infrared light.

Devices used for security, such as a monitoring camera for crime prevention and a camera for personal authentication.

Devices used for beauty care, such as skin measurement equipment that takes images of the skin and a microscope that takes images of the scalp.

Devices used for sports, such as an action camera and a wearable camera for sports and the like.

Devices used for agriculture, such as a camera for monitoring the condition of the field and crops.

Additionally, the present technology may also be configured as below.

(1)

An image sensor including:

a pixel array unit in which pixels having a photoelectric conversion function are arranged in an array;

an AD conversion unit configured to perform analog-to-digital (AD) conversion processing on pixel signals output from the pixels in parallel for each column of the pixels of the pixel array unit;

a memory unit configured to hold pixel signals of any number of rows subjected to AD conversion in the AD conversion unit for each column of the pixels;

an inter-pixel image processing unit configured to read pixel signals of any rows and columns from the memory unit, and perform computing between the pixel signals in parallel for each column of the pixels; and an output circuit configured to control output, to an outside, of pixel signals output from the AD conversion unit and pixel signals output from the inter-pixel image processing unit.

(2)

The image sensor according to (1), further including a control circuit configured to cause pixel reading processing of reading pixel signals from the pixel array unit out to the AD conversion unit, AD conversion processing on pixel signals performed by the AD conversion unit, inter-pixel image processing performed by the inter-pixel image processing unit, and data output processing of outputting data from the AD conversion unit and the inter-pixel image processing to operate in parallel.

(3)

The image sensor according to (2), in which, in accordance with control by the control circuit, the AD conversion unit changes a grayscale in performing AD conversion on the pixel signals.

(4)

The image sensor according to any one of (1) to (3), in which the inter-pixel image processing unit includes a pixel selection circuit configured to select pixel signals to be subjected to inter-pixel image processing among pixel signals held in the memory unit, a computing unit configured to perform computing between pixel signals selected by the pixel selection circuit, a working memory configured to temporarily hold pixel signals subjected to computing by the computing unit, and an output circuit unit configured to output pixel signals subjected to computing by the computing unit, and the computing units are arranged in parallel for each column of the pixels in the pixel array unit and have a single instruction/multiple data (SIMD)-type parallel computing function.

(5)

The image sensor according to any one of (1) to (4), in which the output circuit is capable of simultaneously outputting, individually outputting, or alternately outputting pixel signals output from the AD conversion unit and pixel signals output from the inter-pixel image processing unit.

(6)

The image sensor according to any one of (1) to (5), further including:

a grayscale conversion unit configured to perform grayscale conversion processing based on any threshold, in parallel for each column, on pixel signals subjected to inter-pixel image processing in the inter-pixel image processing unit;

a frame memory unit configured to hold pixel signals of one frame subjected to grayscale conversion processing by the grayscale conversion unit; and an inter-frame image processing unit configured to perform inter-frame image processing by using an image based on pixel signals output from the grayscale conversion unit and an image based on pixel signals of an immediately preceding frame held in the frame memory unit.

(7)

The image sensor according to (6), further including a control circuit configured to cause pixel reading processing of reading pixel signals from the pixel array unit out to the AD conversion unit, AD conversion processing on pixel signals performed by the AD conversion unit, inter-pixel image processing performed by the inter-pixel image processing unit, data output processing of outputting data from the AD conversion unit and the inter-pixel image processing, and inter-frame image processing performed by the inter-frame image processing unit to operate in parallel.

(8)

The image sensor according to (7), in which the AD conversion unit and the grayscale conversion unit change a grayscale in accordance with control by the control circuit, and a variable range in which the AD conversion unit changes a grayscale is equal to or greater than a variable range in which the grayscale conversion unit changes a grayscale.

(9)

The image sensor according to any one of (6) to (8), in which the inter-frame image processing unit includes a pixel selection circuit configured to select pixel signals to be subjected to inter-frame image processing among pixel signals held in the frame memory unit, a computing unit configured to perform computing between pixel signals selected by the pixel selection circuit, a working memory configured to temporarily hold pixel signals subjected to computing by the computing unit, and an output circuit unit configured to output pixel signals subjected to computing by the computing unit, and the computing units are arranged in parallel for each column of the pixels in the pixel array unit and have a single instruction/multiple data (SIMD)-type parallel computing function.

(10)

The image sensor according to any one of (6) to (9), in which the output circuit is capable of simultaneously outputting, individually outputting, or alternately outputting pixel signals output from the AD conversion unit, pixel signals output from the inter-pixel image processing unit, and pixel signals output from the inter-frame image processing unit.

(11)

The image sensor according to any one of (1) to (10), in which a plurality of the AD conversion units is provided to be arranged in parallel with two opposite sides of the pixel array unit, the memory unit and the inter-pixel image processing unit are provided for an output of any one of a plurality of the AD conversion units, and an output of each of a plurality of the AD conversion units is connected to the output circuit.

(12)

The image sensor according to (11), further including a control circuit configured to cause pixel reading processing of reading pixel signals from the pixel array unit out to the AD conversion unit, AD conversion processing on pixel signals performed by a plurality of the AD conversion units, inter-pixel image processing performed by the inter-pixel image processing unit, and data output processing of outputting data from the AD conversion unit and the inter-pixel image processing to operate in parallel.

(13)

The image sensor according to (11) or (12), in which, while the AD conversion unit whose output is not provided with the memory unit and the inter-pixel image processing unit, among a plurality of the AD conversion units, is performing AD conversion on pixel signals of one row with a first grayscale, the AD conversion unit whose output is provided with the memory unit and the inter-pixel image processing unit performs AD conversion on pixel signals of one row with a second grayscale smaller than the first grayscale.

(14)

The image sensor according to any one of (11) to (13), in which the output circuit is capable of simultaneously outputting, individually outputting, or alternately outputting pixel signals output from a plurality of the AD conversion units and pixel signals output from the inter-pixel image processing unit.

(15)

The image sensor according to any one of (1) to (14), in which an analog portion including at least the pixel array unit and a portion that performs processing on pixel signals subjected to AD conversion are provided on different chips, and the chips constitute a stacked structure.

(16)

The image sensor according to (15), in which a plurality of the chips is connected in a column-parallel manner by a joining means using a through electrode or a bump.

(17)

A method for driving an image sensor including a pixel array unit in which pixels having a photoelectric conversion function are arranged in an array, an AD conversion unit configured to perform analog-to-digital (AD) conversion processing on pixel signals output from the pixels in parallel for each column of the pixels of the pixel array unit, a memory unit configured to hold pixel signals of any number of rows subjected to AD conversion in the AD conversion unit for each column of the pixels, an inter-pixel image processing unit configured to read pixel signals of any rows and columns from the memory unit, and perform computing between the pixel signals in parallel for each column of the pixels, and an output circuit configured to control output, to an outside, of pixel signals output from the AD conversion unit and pixel signals output from the inter-pixel image processing unit, the method including:

causing pixel reading processing of reading pixel signals from the pixel array unit out to the AD conversion unit, AD conversion processing on pixel signals performed by the AD conversion unit, inter-pixel image processing performed by the inter-pixel image processing unit, and data output processing of outputting data from the AD conversion unit and the inter-pixel image processing to operate in parallel.

(18)

An electronic apparatus including an image sensor including a pixel array unit in which pixels having a photoelectric conversion function are arranged in an array, an AD conversion unit configured to perform analog-to-digital (AD) conversion processing on pixel signals output from the pixels in parallel for each column of the pixels of the pixel array unit, a memory unit configured to hold pixel signals of any number of rows subjected to AD conversion in the AD conversion unit for each column of the pixels, an inter-pixel image processing unit configured to read pixel signals of any rows and columns from the memory unit, and perform computing between the pixel signals in parallel for each column of the pixels, and an output circuit configured to control output, to an outside, of pixel signals output from the AD conversion unit and pixel signals output from the inter-pixel image processing unit.

Note that the present embodiment is not limited to the embodiments described above, and various changes and modifications may be made without departing from the scope of the present disclosure.

REFERENCE SIGNS LIST

11 image sensor
12 pixel array unit
13 vertical scanning circuit
14 column-parallel AD conversion unit
15 column-parallel memory unit
16 column-parallel inter-pixel image processing unit 17 control circuit
18 output circuit
19 and 20 bus
21 column-parallel grayscale conversion unit
22 frame memory unit
23 column-parallel inter-frame image processing unit
24 and 25 bus
31 pixel
32 row control line
33 column signal line
34 AD conversion unit
35 memory circuit
36 inter-pixel image processing circuit
37 grayscale conversion circuit
38 inter-frame image processing circuit
41 hit selection circuit unit
42 pixel selection circuit unit
43 computing selection circuit unit
44 computing unit
45 carry control unit
46 output circuit unit
47 working memory unit
48 working memory internal selection circuit
49 working memory external selection circuit
51 to 55 selector
61 semiconductor chip
62 connection portion

The invention claimed is:

1. An image sensor comprising:
a pixel array in which pixels having a photoelectric conversion function are arranged in an array;
an AD converter configured to perform analog-to-digital (AD) conversion processing on pixel signals output from the pixels in parallel for each column of the pixels of the pixel array;
a memory configured to hold pixel signals of any number of rows subjected to AD conversion in the AD converter for each column of the pixels;
an inter-pixel image processor configured to read pixel signals of any rows and columns from the memory, and perform computing between the pixel signals in parallel for each column of the pixels;
an output circuit configured to control output, to an outside, of pixel signals output from the AD converter and pixel signals output from the inter-pixel image processor;
a grayscale converter configured to perform grayscale conversion processing based on any threshold, in parallel for each column, on pixel signals subjected to inter-pixel image processing in the inter-pixel image processor;
a frame memory configured to hold pixel signals of one frame subjected to grayscale conversion processing by the grayscale converter; and
an inter-frame image processor configured to perform inter-frame image processing by using an image based on pixel signals output from the grayscale converter and an image based on pixel signals of an immediately preceding frame held in the frame memory.

2. The image sensor according to claim 1, further comprising
a control circuit configured to cause pixel reading processing of reading pixel signals from the pixel array out to the AD converter, AD conversion processing on pixel signals performed by the AD converter, inter-pixel image processing performed by the inter-pixel image processor, and data output processing of outputting data from the AD converter and the inter-pixel image processor to operate in parallel.

3. The image sensor according to claim 2, wherein, in accordance with control by the control circuit, the AD converter changes a grayscale in performing AD conversion on the pixel signals.

4. The image sensor according to claim 2, wherein
the inter-pixel image processor includes
a pixel selection circuit configured to select pixel signals to be subjected to inter-pixel image processing among pixel signals held in the memory,
a computing unit configured to perform computing between pixel signals selected by the pixel selection circuit,
a working memory configured to temporarily hold pixel signals subjected to computing by the computing unit, and
an output circuit configured to output pixel signals subjected to computing by the computing unit, and
a plurality of the computing units are arranged in parallel for each column of the pixels in the pixel array unit and have a single instruction/multiple data (SIMD)-type parallel computing function.

5. The image sensor according to claim 2, wherein the output circuit is capable of simultaneously outputting, individually outputting, or alternately outputting pixel signals output from the AD converter and pixel signals output from the inter-pixel image processor.

6. The image sensor according to claim 1, further comprising
a control circuit configured to cause pixel reading processing of reading pixel signals from the pixel array unit out to the AD converter, AD conversion processing on pixel signals performed by the AD converter, inter-pixel image processing performed by the inter-pixel image processor, data output processing of outputting data from the AD converter and the inter-pixel image processing, and inter-frame image processing performed by the inter-frame image processor to operate in parallel.

7. The image sensor according to claim 6, wherein the AD converter and the grayscale converter change a grayscale in accordance with control by the control circuit, and a variable range in which the AD converter changes a grayscale is equal to or greater than a variable range in which the grayscale converter changes a grayscale.

8. The image sensor according to claim 6, wherein
the inter-frame image processor includes
a pixel selection circuit configured to select pixel signals to be subjected to inter-frame image processing among pixel signals held in the frame memory,
a computing unit configured to perform computing between pixel signals selected by the pixel selection circuit,
a working memory configured to temporarily hold pixel signals subjected to computing by the computing unit, and
an output circuit configured to output pixel signals subjected to computing by the computing unit, and
a plurality of the computing units are arranged in parallel for each column of the pixels in the pixel array unit and have a single instruction/multiple data (SIMD)-type parallel computing function.

9. The image sensor according to claim 6, wherein the output circuit is capable of simultaneously outputting, individually outputting, or alternately outputting pixel signals output from the AD converter, pixel signals output from the inter-pixel image processor, and pixel signals output from the inter-frame image processor.

10. The image sensor according to claim 1, wherein
a plurality of the AD converters is provided to be arranged in parallel with two opposite sides of the pixel array,
the memory and the inter-pixel image processor are provided for an output of any one of a plurality of the AD converters, and
an output of each of a plurality of the AD converters is connected to the output circuit.

11. The image sensor according to claim 10, further comprising
a control circuit configured to cause pixel reading processing of reading pixel signals from the pixel array unit out to the AD converter, AD conversion processing on pixel signals performed by a plurality of the AD converters, inter-pixel image processing performed by the inter-pixel image processor, and data output processing of outputting data from the AD converter and the inter-pixel image processing to operate in parallel.

12. The image sensor according to claim 11, wherein, while the AD converter whose output is not provided with the memory and the inter-pixel image processor, among a plurality of the AD converters, is performing AD conversion on pixel signals of one row with a first grayscale, the AD converter whose output is provided with the memory and the inter-pixel image processor performs AD conversion on pixel signals of one row with a second grayscale smaller than the first grayscale.

13. The image sensor according to claim 10, wherein the output circuit is capable of simultaneously outputting, individually outputting, or alternately outputting pixel signals output from a plurality of the AD converters and pixel signals output from the inter-pixel image processor.

14. The image sensor according to claim 1, wherein an analog portion including at least the pixel array and a portion that performs processing on pixel signals subjected to AD conversion are provided on different chips, and the chips constitute a stacked structure.

15. The image sensor according to claim 14, wherein a plurality of the chips is connected in a column-parallel manner by a joining means using a through electrode or a bump.

16. A method for driving an image sensor including
a pixel array which pixels having a photoelectric conversion function are arranged in an array,
an AD converter configured to perform analog-to-digital (AD) conversion processing on pixel signals output from the pixels in parallel for each column of the pixels of the pixel array,
a memory configured to hold pixel signals of any number of rows subjected to AD conversion in the AD converter for each column of the pixels,
an inter-pixel image processor configured to read pixel signals of any rows and columns from the memory unit, and perform computing between the pixel signals in parallel for each column of the pixels,
an output circuit configured to control output, to an outside, of pixel signals output from the AD converter and pixel signals output from the inter-pixel image processor,
a grayscale converter configured to perform grayscale conversion processing based on any threshold, in parallel for each column, on pixel signals subjected to inter-pixel image processing in the inter-pixel image processor;
a frame memory configured to hold pixel signals of one frame subjected to grayscale conversion processing by the gray scale converter; and
an inter-frame image processor configured to perform inter-frame image processing by using an image based on pixel signals output from the grayscale converter and an image based on pixel signals of an immediately preceding frame held in the frame memory
the method comprising:
causing pixel reading processing of reading pixel signals from the pixel array out to the AD converter, AD conversion processing on pixel signals performed by the AD converter, inter-pixel image processing performed by the inter-pixel image processing processor, and data output processing of outputting data from the AD converter and the inter-pixel image processing to operate in parallel.

17. An electronic apparatus comprising
an image sensor including
a pixel array in which pixels having a photoelectric conversion function are arranged in an array,
an AD converter configured to perform analog-to-digital (AD) conversion processing on pixel signals output from the pixels in parallel for each column of the pixels of the pixel array,
a memory configured to hold pixel signals of any number of rows subjected to AD conversion in the AD converter for each column of the pixels,
an inter-pixel image processor configured to read pixel signals of any rows and columns from the memory unit, and perform computing between the pixel signals in parallel for each column of the pixels,
an output circuit configured to control output, to an outside, of pixel signals output from the AD converter and pixel signals output from the inter-pixel image processor,
a grayscale converter configured to perform grayscale conversion processing based on any threshold, in parallel for each column, on pixel signals subjected to inter-pixel image processing in the inter-pixel image processor,
a frame memory configured to hold pixel signals of one frame subjected to grayscale conversion processing by the grayscale converter, and
an inter-frame image processor configured to perform inter-frame image processing by using an image based on pixel signals output from the grayscale converter and an image based on pixel signals of an immediately preceding frame held in the frame memory.

* * * * *